J. H. DENNIS.
BEEHIVE.
No. 10,445.  Patented Jan. 24, 1854.
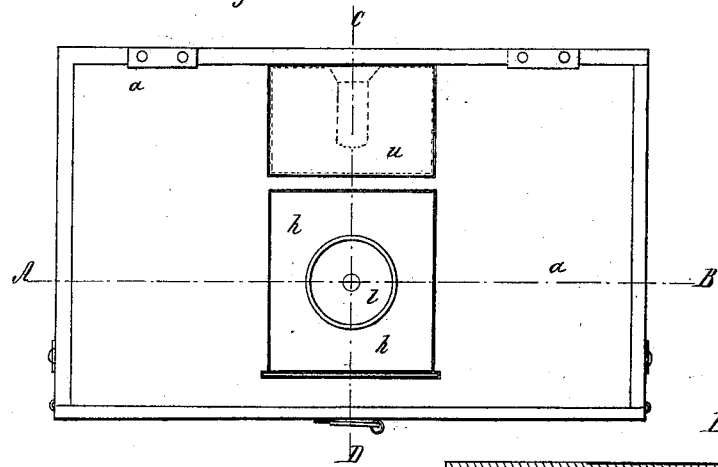
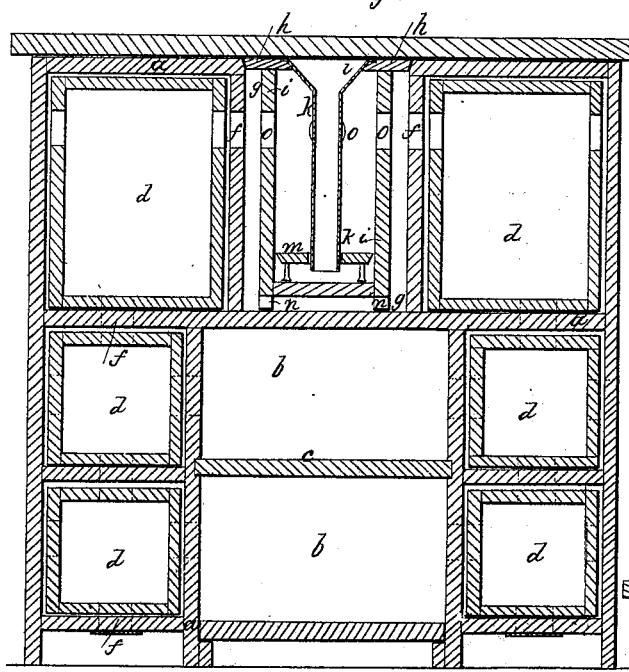
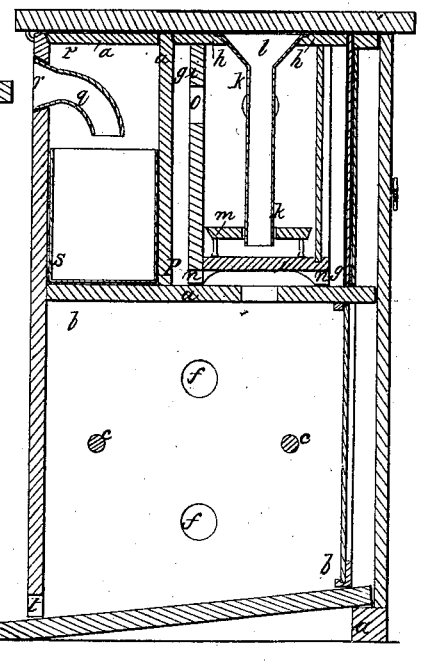

UNITED STATES PATENT OFFICE.

JOHN H. DENNIS, OF BOSTON, MASSACHUSETTS.

BEEHIVE.

Specification of Letters Patent No. 10,445, dated January 24, 1854.

*To all whom it may concern:*

Be it known that I, JOHN H. DENNIS, of Boston, in the county of Suffolk and State of Massachusetts, have invented certain new and useful Improvements in Beehives, and that the following description, taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plate of drawings represent my improvements.

Figure 1 is a plan or top view of my improved beehive, the upper cover being removed. Fig. 2 is a longitudinal vertical section of the same taken in the plane of the line AB, Fig. 1, and Fig. 3 is a transverse vertical section of the same taken in the plane of the line CD, Fig. 1.

To those who are at all acquainted with the habits of bees it is well known that first they provide a sufficiency of honey for themselves, in the apartment in which they live, and afterward, if compartments be provided, will fill and as it were hermetically seal up quantities of honey in these compartments. In rainy days and in early spring being prevented by the weather from obtaining honey from the flowers, they consume their own store, which on the return of favorable weather, they first replenish before laboring on that in the other compartments. It will thus be seen that a large proportion of the year is spent in feeding upon and in obtaining honey for their own immediate store, which if they could be fed from other sources would be devoted to increasing the quantity in the other compartments.

The main purpose and object of my improvements is so to feed them.

*a a a* in the drawings represents the hive, constructed as shown, or in any other suitable manner.

*b b* is the apartment where the bees live and have their own stores, and in which longitudinal bars *c c* are placed to support the honey comb.

*d, d, d,* &c., are the lateral chambers provided for the stores of honey, which being separate from the main body of the hive may be removed when full and emptied of their contents, glass slide doors being provided for that purpose. When removed the apertures *f, f, f,* &c., by means of which the bees have access to all parts of the hive, are closed with a piece of tin, as is common, or in any other suitable manner. In a part of the hive to which all the bees may gain access is formed a chamber *g g* having a movable cover *h h,* which contains my feeding apparatus, constructed substantially as follows:—A box *i i* of wood or metal, open at the top, is supported at such distance from the floor of the chamber and is of such dimensions that the bees may move readily under and around the same between its sides and the sides of the chamber *g g*. The movable cover *h h* of the chamber forms the movable top of the box. Through this top extends vertically down to within a short distance of the bottom the pipe *k k,* having a tunnel *l* at its upper opening. Working loosely upon this pipe in a vertical direction is the float *m,* which is of rather smaller superficial dimensions than a horizontal section of the box, having on its under surface suitable legs or supports *n n,* that it may not at any time touch the bottom of the box. Apertures *o, o* are provided in the sides of this box, which serve as way of entrance to the same for the bees.

I pour diluted West India honey or other sweet fluid through the pipe *k k* into the receptacle or box *i i,* until it is sufficiently full. The float *m,* it will be seen, will rise with and remain on the surface of the fluid poured in. The bees coming from all parts of the hive enter the box *i i* through the apertures *o, o,* and standing on the float (the undersides of which are beveled to facilitate the operation) feed from the honey around its edges.

In hives heretofore constructed no means have been devised by which the bees could be fed continuously. By my improvements I not only am able to feed them continuously, but it is so simple that a child may feed them, and by means of the pipe *k k* so cleanly that none of the food will be dripped upon the bees. In summer, or when the bees can obtain honey from without, a solid block of wood may be fitted into the chamber *g g,* in place of the feeding apparatus.

In my new hive I have also combined another improvement, which is intended to protect the honey from the "bee moth," and which I term the "moth trap." This "bee-moth," if not prevented, will enter the hive and deposit its eggs in the cells of the honey comb. The worms when hatched from these eggs devour the honey around them. To protect the honey from the ravages of these moths I have devised the following trap: In some suitable part of the hive, I construct a chamber $p\ p$ (having a movable cover $u$) connected with the outside of the hive by a pipe $q$ leading through the aperture $r$. In this chamber is placed a vessel $s$, containing molasses and water, sour milk or other attractive fluid. The moth hovering about the hive is repelled from the only real entrance at $t$, by the sentinel bees, and is attracted to the entrance of the trap, the aperture $r$. Having once entered the chamber $p\ p$ the moth will not easily find its way out again. As the pipe $q$, through which his ingress is made, is of a conical or tapering shape, and as all moths are small at their heads, with wings which spread out very considerably, it is plain that with such an arrangement of the parts, with the attractive fluid in the close chamber $p\ p$, while the ingress of moths will be comparatively easy, his egress is almost impossible and his destruction certain.

It will be seen that the cover $u$ of the chamber $p\ p$ may be removed, and the vessels taken out and cleansed whenever necessary, the pipe $q$ being withdrawn during the operation.

Having thus described my improvements in beehives, I shall state my claims, as follows:

What I claim as my invention, and desire to have secured to me by Letters Patent, is—

A moth-trap consisting of close chamber, having no communication with the rest of the hive, and in which may be placed a vessel containing some fluid attractive to the bee-moth, in combination with a conical or tapering entrance tube as herein above set forth.

J. H. DENNIS.

Witnesses:
 EZRA LINCOLN,
 ROBERT L. HARRIS.